(12) United States Patent
Dolan et al.

(10) Patent No.: US 8,547,583 B2
(45) Date of Patent: Oct. 1, 2013

(54) METHOD AND APPARATUS FOR PRINTING FROM A MOBILE DEVICE

(75) Inventors: Simon Dolan, Newton, MA (US); Elliott J. Bradshaw, Belmont, MA (US)

(73) Assignee: CSR Imaging US, LP, Burlington, MA (US)

( * ) Notice: Subject to any disclaimer, the term of this patent is extended or adjusted under 35 U.S.C. 154(b) by 21 days.

(21) Appl. No.: 13/564,011

(22) Filed: Aug. 1, 2012

(65) Prior Publication Data

US 2012/0293841 A1   Nov. 22, 2012

Related U.S. Application Data

(62) Division of application No. 11/780,281, filed on Jul. 19, 2007, now Pat. No. 8,248,637.

(51) Int. Cl.
*G06F 3/12* (2006.01)
*G06F 15/00* (2006.01)
*G06K 15/00* (2006.01)

(52) U.S. Cl.
USPC .......... 358/1.15; 358/1.9; 358/1.13; 358/1.16

(58) Field of Classification Search
None
See application file for complete search history.

(56) References Cited

U.S. PATENT DOCUMENTS

| | | | |
|---|---|---|---|
| 6,975,419 B2 | 12/2005 | Staas et al. | |
| 2002/0113994 A1 | 8/2002 | Smith et al. | |
| 2003/0003957 A1 | 1/2003 | Berkema et al. | |
| 2003/0063749 A1 | 4/2003 | Revel et al. | |
| 2004/0001217 A1* | 1/2004 | Wu .............................. | 358/1.15 |
| 2004/0185877 A1 | 9/2004 | Asthana et al. | |
| 2005/0026593 A1 | 2/2005 | Anderson et al. | |
| 2005/0086282 A1 | 4/2005 | Anderson et al. | |
| 2007/0124516 A1 | 5/2007 | Ohara et al. | |

OTHER PUBLICATIONS

Printing for Camera Phones; By: electricnews.net; Published by: The Register; UK; Publication date: Jan. 12, 2005.
White Paper: Point, Shoot and Share: Simplifying the Transfer and Viewing of Digital Images from Mobile Devices; Published by SMSC, Hauppauge, NY; Publication Date: May 5, 2005.
White Paper: MCCI PictBridge Implementation; Published by Moore Computer Consultants, Incorporated. Ithaca, New York, Publication Date: 2005.

* cited by examiner

*Primary Examiner* — Thomas Lett
(74) *Attorney, Agent, or Firm* — Lando & Anastasi, LLP

(57) ABSTRACT

A system and method by which to implement revenue sharing between printer vendors and network service providers or operators. In one example, a method for providing printing access to a mobile device may include acts of requesting information from a printer, receiving the information at a mobile device, providing the information to a communications subsystem of a mobile network operator, based on the information, acquiring a printing capability of the printer, sending the printing capability from the communications subsystem to the mobile device, and upon receipt of the printing capability, if the printing capability is enabled, sending a print request from the mobile device to the printer. A corresponding apparatus may be used to implement the method, which may be provided as instructions encoded on a computer readable medium.

8 Claims, 3 Drawing Sheets

METHOD AND APPARATUS FOR PRINTING FROM A MOBILE DEVICE

RELATED APPLICATIONS

This application is a division of and claims the benefit under 35 U.S.C. §§120 and 121 to U.S. application Ser. No. 11/780,281 filed Jul. 19, 2007 and titled "METHOD AND APPARATUS FOR PRINTING FROM A MOBILE DEVICE" which is herein incorporated by reference in its entirety.

BACKGROUND OF THE INVENTION

1. Field of Invention

This present invention is directed to wireless printing applications, more particularly, to printing from handheld devices, such as cellular telephones.

2. Discussion of Related Art

Recent years have seen a proliferation of portable electronic devices such as personal digital assistants (PDA's), mobile (cellular) telephones, and/or other portable electronic devices. These mobile devices offer a range of capabilities, including mobile calendars, organizing capabilities, and electronic mail (email) received and transmitted via a mobile pager network or other mobile networks, etc. In particular, the mobile phone market has seen a dramatic increase in the number of phones sold with built-in cameras. While generally not of the same quality as dedicated cameras, these devices have proven popular for taking casual images and sending the images to other people, usually over the mobile phone network. The feature is also popular with mobile phone network service providers (hereinafter referred to as "carriers"), who typically charge a fee of up to 25 cents to send an image, and often another fee to receive the image.

In addition to sending images from one user to another, a user may want to print the pictures taken with their wireless phone camera. However, most wireless phones do not have user-accessible printing capability, often because printing applications are blocked by the carrier. One method by which a user can print images from a wireless phone is by sending the image as an email to their home computer, and printing the image from there. The user then pays the carrier's fees for sending the image. This method has several disadvantages. First, it is inconvenient to set up and to use. Second, it requires that the destination printer is attached to the user's personal computer. This excludes the growing segment of standalone snapshot printers, which can operate without a personal computer. Third, this method is limited to use in locations near the user's home personal computer.

U.S. Pat. No. 6,975,419 entitled "System and Method for Mobile Printing" (hereinafter referred to as the '419 patent) discloses a printing system and method that facilitates mobile printing of a document using an email system as discussed above. Referring to FIG. 1, there is illustrated a block diagram of a mobile print network 100 in to accordance with the disclosure of the '419 patent. According to the '419 patent, a user at a print site 101 carries a mobile device 102. Stored on the mobile device 102 is a document 104 that the user wishes to print out. At the print site 101, the user may have several choices of printers, including printers 105 and 107 and other printers linked to the local area network 109, any of which could be used to print the document 104. Assume that the user chooses to print the document 104 on the printer 105 that is coupled directly to the local area network 109. According to the '419 patent, the user may walk up to the printer 105 and identify the particular printer alias 108a that is assigned thereto. This printer alias 108a is printed in a label form that is attached to the printer 105, thereby associating the alias with the printer 105.

The '419 patent discloses that once the user knows the printer alias 108a associated with the printer 105, the user then creates an email message with the email system 110 in the mobile device 102 and attaches the document 104 to be printed to the email message. The user then enters the printer alias 108a as the destination address for the email message and then transmits the email message to the printer 105. The email message with the attached document 104 then is transmitted from the mobile device 102 over a wireless connection to the mobile network 106. Upon detecting the destination address of the email message, the mobile network 106 then provides the email message to the network 103 through the network gateway 119. The network 103 then routes the same email message to the email server 112, and the gateway 115 in the email server 112 routes the email message to the automated print agent 121. According to the '419 patent, the automated print agent 121 may reside in any one of a mobile print appliance 129, the email server 112, the printer 105, or other devices that are in data communication with the mobile device 102. Therefore, alternatively, the email message may be routed via network gateway 117 and local area network 109 to the automated print agent 121. Regardless of where the automated print agent 121 is located, in all cases it acts as a network destination for the email message with the attached document 104 that was addressed to the printer alias 108a. Upon receiving the email message with the attached document 104, the automated print agent 121 orchestrates the printing of the document 104 on the printer 105. In doing so, the automated print agent 121 transmits the document 104 to the rendering application 123 to have the document 104 rendered in a printer ready format. The rendering application 123 may be located in the email server 112, the mobile print appliance 129, or the mobile print server 113 as shown, as well as in other devices that are in data communication with the automated print agent 121. The printer ready format may be, for example, printer control language (PCL) or PostScript. Thus, the '419 patent discloses a method of local wireless printing that uses an email system, as discussed above.

SUMMARY OF INVENTION

Aspects and embodiments of the invention may address the above-mentioned limitations of the prior art and may provide local wireless printing from mobile phones, and other devices, without requiring the use of an email-based system. In particular, aspects and embodiments of the invention are directed to a printing system and method that provides for cooperation and revenue sharing between a carrier and a printer vendor. For example, a printing system and method in accordance with embodiments of the invention may allow a printer vendor (e.g., manufacturer and/or seller) to share printing revenue with a network service provider ("carrier") in exchange for increasing the use of printer consumables provided by the printer vendor, and a targeted promotional effort by the carrier to expand the use of the image printing application.

According to one embodiment, a method for providing printing access to a mobile device may comprise acts of requesting information from a printer, receiving the information at a mobile device, providing the information to a communications subsystem of a mobile network operator, based on the information, acquiring a printing capability of the printer, sending the printing capability from the communications subsystem to the mobile device, and upon receipt of the printing capability, if the printing capability is enabled, sending a print request from the mobile device to the printer.

In another embodiment, a method of revenue sharing between a printer vendor and a wireless network operator may comprise acts of collecting information from a printer, determining if revenue sharing arrangements exist for the printer, and based on the determining act, controlling local wireless printing to the printer.

Another embodiment of a method for providing printing access to a mobile device may comprise the acts of requesting information from a printer, receiving the information at a mobile device, sending the information to a communications subsystem of a mobile network, receiving from the communications subsystem a print authorization if revenue sharing arrangements exist for the printer, and upon receipt of the print authorization, sending a print request from the mobile device to the printer.

According to another embodiment, a method of revenue sharing between a printer vendor and a mobile network operator may comprise acts of receiving printer information from a mobile device, determining from the printer information whether the printer has a capability for revenue sharing arrangements, and if the printer has a capability for revenue sharing arrangements, sending a print authorization message to the mobile device.

According to another embodiment, a method of providing printing access to a mobile device may comprise acts of receiving at a printer a print inquiry from the mobile device, providing information from the printer to the mobile device responsive to the print inquiry, the information comprising at least one of printer identification information and printer component identification information, receiving at the printer a print request from the mobile device, printing responsive to the print request, and sending a print complete notification to the mobile device.

BRIEF DESCRIPTION OF DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
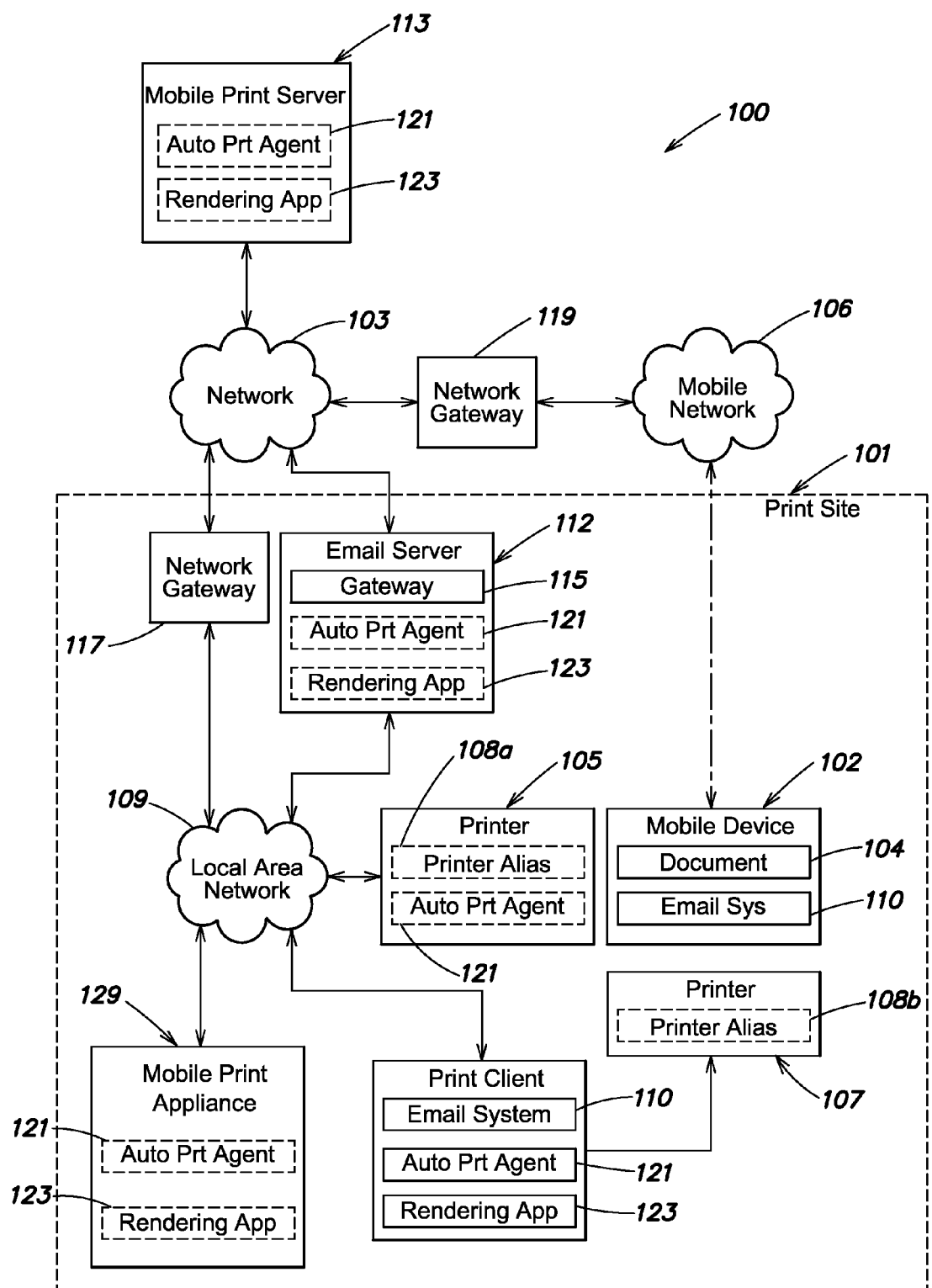
FIG. 1 is a block diagram of a conventional wireless printing technique as disclosed in U.S. Pat. No. 6,975,419.

As discussed above, the number of mobile phones sold with built-in cameras has been increasing. At the same time, a growing number of mobile phones include wireless Bluetooth® technology. Current popular applications of Bluetooth® within mobile phones include wireless headsets and hands-free phone kits for use while driving. Any mobile phone with a camera and a Bluetooth® module has the technical capability to make local wireless to prints of images. Furthermore, a growing number of general purpose home printers, as well as snapshot printers, have Bluetooth® modules either built-in, or available as an upgrade. With such a printer, the Bluetooth® camera phone could print images immediately, without cables. The technical protocols for this print operation are well defined, well tested, widely implemented, and publicly available. However, as discussed above, mobile phone network service providers or operators (referred to herein as "carriers") often control the capabilities of phones (since they provide them with service plans) and these carriers may block Bluetooth® (or other wireless) printing functions of the phones. Even if the capability is not blocked, traditionally, the carrier has had no incentive to promote or enhance this feature and capability on the phone because conventionally the carrier receives no revenue when an image is printed this way, whereas the carrier does receive revenue from an image being transmitted by email, as discussed above. On the other hand, printer vendors (e.g., manufacturers and/or suppliers) and printer component vendors do receive revenue from printed images because the user pays for each print by purchasing the printer and supplies for printer, such as ink and paper.

Accordingly, aspects of the invention provide a system and method by which to implement revenue sharing between printer vendors and carriers. Because printer vendors make money every time an image is printed, for example, through sales of consumables, they may be willing to share a portion of that revenue for images which would not otherwise be printed. In one example, the carrier may offer the printer vendor a targeted, pay-per-action marketing tool to drive printer usage and consumable consumption in exchange for a portion of the revenue received by the printer vendor for each shared print action. Such revenue sharing may provide an incentive for carriers to enable or enhance local printing features for mobile phones, thus encouraging users to print images taken with a camera phone and providing benefits to the carrier, the printer vendor and the user. According to embodiments of the invention, there may be provided methods and apparatus used for the reliable and low cost collection, consolidation, formatting and transmitting of the printer characteristic data and/or consumable usage data. In one embodiment, this data may be collected from the printers by the mobile phone initiating the printing, as discussed further below. The data may then be used to provide the carrier with information to allow the carrier to dynamically enable basic or advanced printing based on the ability to receive revenue for the printing.

It is to be appreciated that this invention is not limited in its application to the details of construction and the arrangement of components set forth in the following description or to illustrated in the drawings. The invention is capable of other embodiments and of being practiced or of being carried out in various ways. Examples of specific implementations are provided herein for illustrative purposes only and are not intended to be limiting. In particular, acts, elements and features discussed in connection with one embodiment are not intended to be excluded from a similar role in other embodiments. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

According to one embodiment, using the below-described system and methods, a carrier may be able to determine if a particular printer has billing arrangements in place, enable or enhance local wireless printing to that printer, and obtain usage information (e.g. paper and ink consumed) to allow the carrier to recover a fee from the printer vendor. The mobile phone network may be used to gather information about a particular printer so that the carrier may determine whether the printer has revenue sharing arrangements in place. If revenue sharing arrangements are in place for the printer, the carrier may enable or enhance local wireless printing to that printer, followed by the collection of printer usage information in order to recover shared revenue from the printer vendor, as discussed in more detail below. In one embodiment, the system may employ commercially available communication channels, such as Bluetooth®, with its associated set of firmware stacks, to gather printer characteristics and printer consumable use metrics, and transmit this data to mobile phone network operators by means of a mobile phone network. Thus, the system and methods of the invention may be implemented for existing printers, phones and mobile phone networks without requiring new hardware or new communication protocols. It is to be appreciated that although the following discussion may focus on local wireless printing, the principles of the invention apply equally to local wired printing from a mobile phone to a printer, for example, using a USB or other type of cable. It also is to be appreciated that although Bluetooth® communication channel technology is mentioned above, other wireless technologies, such as 802.11b/a/g/n, commonly known as "Wi-Fi," may be employed for the same purpose, when such technology is included within the mobile phone apparatus.

Figure 2:
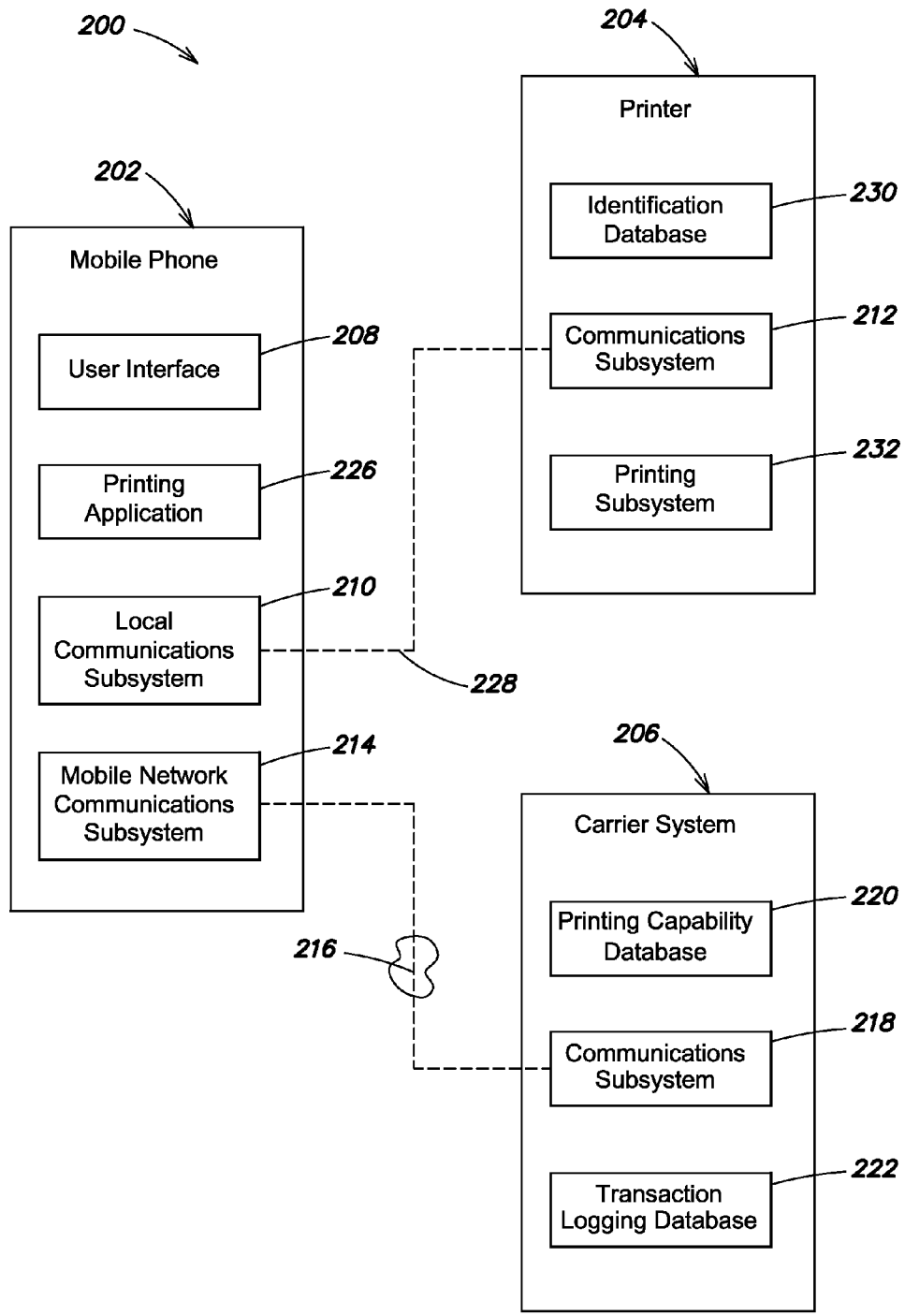
FIG. 2 is a block diagram of one embodiment of a mobile print network according to aspects of the invention.

Referring to FIG. 2, there is illustrated a block diagram of one embodiment of a mobile print network 200 according to aspects of the invention. The mobile print network 200 to includes a mobile phone 202, a printer 204, a mobile phone network 216, and a carrier system 206. It is to be appreciated that the carrier system 206 represents in block diagram form various components and/or functions that may be implemented across one or more computers/processors operated by the carrier and need not be co-located. The carrier system components may include a printing capability database 220, a network communications subsystem 218 and a transaction logging database 222. The printing capability database 220 may store data to identify, for example, printer vendors that have revenue sharing arrangements with the carrier, as discussed further below. Similarly, the transaction logging database 222 may be used to store data received from a printer and/or mobile phone after a printing operation is complete so that the carrier can provide billing information to the printer vendor, as discussed further below.

Still referring to FIG. 2, the mobile phone 202 may comprise a user interface 208 including, for example, a display, buttons, etc. to allow a user to interact with the phone. The mobile phone 202 may also comprise a local communications subsystem 210, for example, a Bluetooth® module that may be used to communicate (as indicated by line 228) with a printer communications subsystem 212 of the printer 204. A mobile network communications subsystem 214 including, for example, an antenna and standard processing circuitry, may allow the mobile phone 202 to communicate with the network communications subsystem 218 over the mobile phone network 216. The mobile phone 202 may also include a print application 226 that may comprise software including commands necessary to prepare a document for printing. The printer 204 may include a printing subsystem 232 that may receive data corresponding to the document to be printed and implement the print operation, as discussed further below. The printer may also comprise an identification database 230 that may comprise identifying information, such as a serial number, printer vendor name or identification number, etc. that may be communicated to the carrier system 206, as discussed further below.

Figure 3:
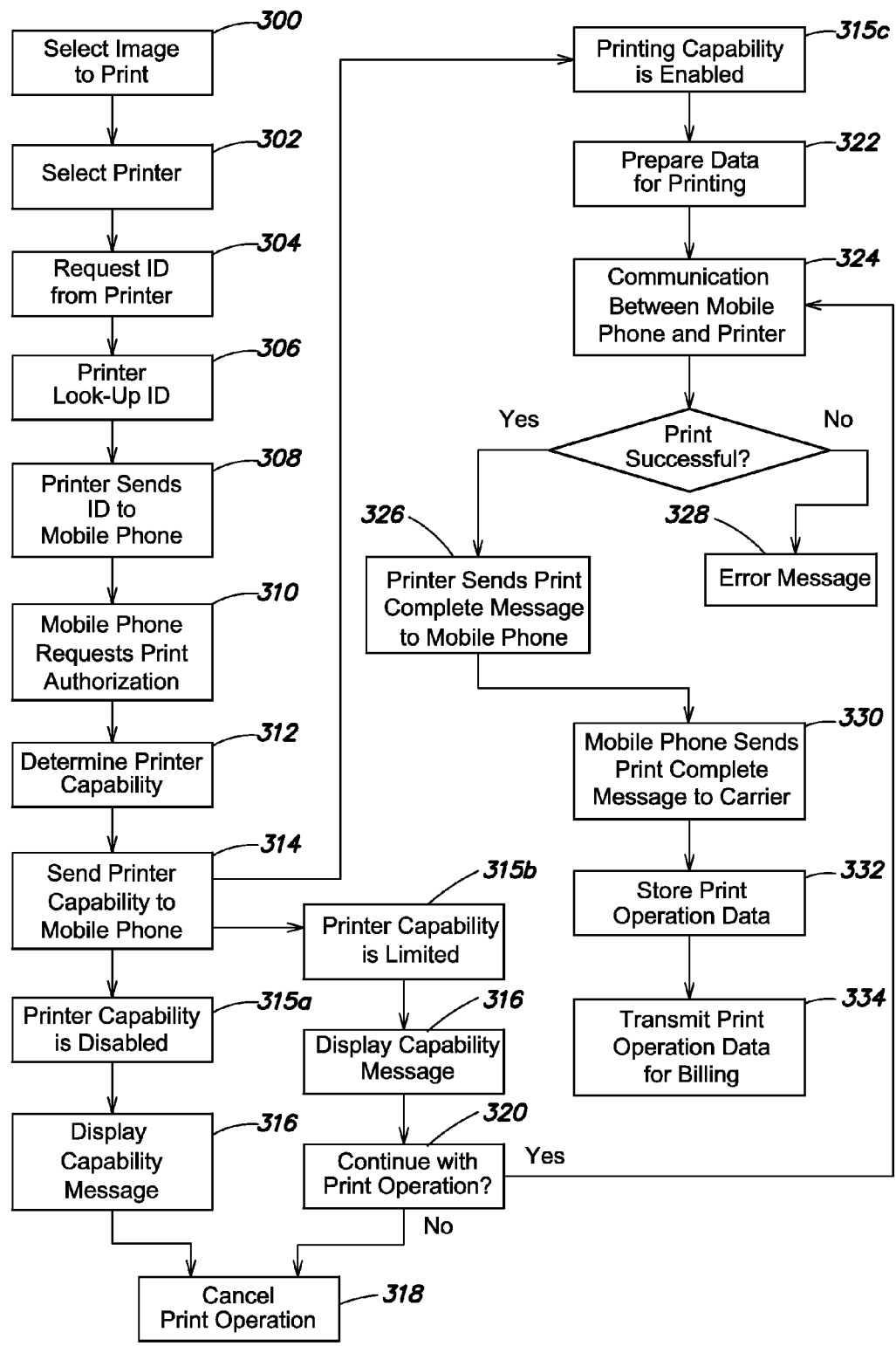
FIG. 3 is a flow diagram illustrating steps of one example of a method of wireless printing according to aspects of the invention.

Operation of the mobile print network of FIG. 2 and aspects of at least one embodiment of a method of local printing implementing revenue sharing is discussed below, with reference to FIG. 3.

When a mobile phone user wishes to print an image or other document from the mobile phone, the user may select, using the user interface 208 (see FIG. 2), the document or image to print through the use of a printing-related function, either a print program (e.g., Print Photos or to Print Address Book etc.) or another application. This selection is represented as step 300 in FIG. 3. It is to be appreciated that for simplicity the data to be printed will be generally referred to herein as an image. However, the principles of the invention are not limited to printing images (such as photographs taken with a camera phone), but may also be applied to printing of any file type or data including, for example, address book information from a phone, a received text message, a word processor document, a business presentation, or other data.

In a next step 302, a printer may be selected on which to print the image. In one example, the user may select an available printer. Selection of a printer may use a wireless discovery protocol, such as Bluetooth® Service Discovery Profile, or may involve selection of a directly connected printer, for example using USB. In another example, the system may default to using a previously selected printer. This default selection may, of course, be overridden by the user.

According to one embodiment, the system may implement a series of steps to determine whether a revenue sharing arrangement is in place for a vendor of the selected printer. Referring to FIG. 3, in a step 304 the mobile phone may request information from the printer, such as identification information. In one example, the mobile phone print application 226 of FIG. 2 may use the mobile phone local communications subsystem 210 to send a "Request Billing ID" message to printer communications subsystem 212. As discussed above, this communication between the mobile phone 202 and the printer 204 may be over a wireless communications protocol such as Bluetooth®, or a wired protocol such as USB. In one example, the communication may be accomplished by sending a packet, in a format defined by a particular implementation compatible with the communication protocol being used, over the selected wireless (e.g. Bluetooth®) or wired (e.g. USB) connection. In one example, this packet may include the following, or a similar, data field:

Header: pre-assigned integer value indicating "Request Billing ID"

In a next step 306, the printer 204 may consult its identification database 230 to discover its Billing Identification (ID). In one example, the Billing ID may comprise data such as a name of a vendor of the printer, a model name or number for the printer, a manufacturer's serial number of the printer, and/or other data that may serve to identify the printer and/or a vendor of the printer or printer components (e.g., ink cartridges).

In a next step 308, the printer may send the Billing ID to the mobile phone via the communications subsystems 212 and 210. In one example, the Billing ID may be sent as a packet of data, similar to the packet that contained the request for ID discussed above in reference to step 304. An example of such a packet may include some or all of the following fields:

Header: pre-assigned integer value indicating "Response Billing ID"
Integer or string: Vendor name
Integer or string: Printer model name
Integer or string: Printer serial number
Integer or string: Ink cartridge model number Integer or string: Ink cartridge serial number Once the mobile phone has received the Billing ID from the printer, the mobile phone may request authorization to use the printer from the carrier. This may include providing the carrier with the printer's Billing ID and receiving authorization from the carrier, as discussed further below. In one example, in step 310, the mobile phone printing application 226 may use the mobile phone mobile network communications subsystem 214 to send a "Request Printing Authorization" message to the network communications subsystem 218. This step may use the current mobile phone network, such as CDMA, GSM, etc. The "Request Printing Authorization" message may include all or part of the printer's Billing ID, as well as mobile phone identification information such as Electronic Serial Number (ESN), Mobile Identification Number (MIN), etc. In one example, the request may be sent as a packet of data as discussed above. This packet may include, for example, some or all of the following fields:

Header: pre-assigned integer value indicating "Request Printing Authorization"
Integer or string: Printer vendor name
Integer or string: Printer model name
Integer or string: Printer serial number
Integer or string: Ink cartridge model number
Integer or string: Ink cartridge serial number
Integer or string: Phone application vendor name
Integer or string: Phone application model name
Integer or string: Phone application serial number
Integer or string: Number of pages to print When the carrier receives the mobile phone's request for printing authorization, the carrier may consult the printing capability database 220 to determine a printing capability for to the identified printer (step 312). Printing capability may be one of enabled, disabled, or limited, and may be based on whether the carrier has made arrangements for revenue sharing with the printer vendor.

In a next step 314, the carrier may provide a message to the mobile phone indicating the printing capability of the printer. The carrier may send the message containing the printing capability to the mobile phone as a packet of data via the communications subsystems 218 and 214. In one example, the packet of data may include an authorization code that may be unique to the particular authorization request. An example of this data packet may include some or all of these fields:

Header: pre-assigned integer value indicating "Response Printing Authorization"
Integer or string: indicates Enabled, Limited, or Disabled
Integer or string: authorization code
String: user notice According to one embodiment, the mobile phone printing application 226 may proceed based on the printing capability of the selected printer, i.e., disabled, limited or enabled, as represented by blocks 315a, 315b, and 315c. In one example, if the printing capability of the selected printer is "Disabled," the user interface of the mobile phone may optionally display a built-in message or other user notification supplied with the capability information from the carrier (step 316). The print application may then either wait for the user to respond or may wait a predetermined time period before "timing out" and canceling the print operation (step 318). If the user selects a new printer, the method may begin again at step 302. In one example, the user notification message could include information that may help the user to select another printer. For example, the message could include an indication that printing to the selected printer is not available and direction to a web page or phone number where the user may obtain a list of supported printers in the vicinity. Similarly, if the printer capability is "Limited," the print application may wait for a user input or timeout. Again, the user notification message may include a web address or other information that may help a user to select another printer that is fully supported. Limited capability may restrict various aspects of printing including available print options, as discussed further below. For example, only a certain number of pages may be printed (e.g., only one page per print job), or only certain types of data may be printed (e.g., phone data, such as address book data, but not photographs or business presentations). Thus, in step 320, the user may select whether to proceed with printing with limited options or to cancel the print job, possibly starting over by selecting a new printer.

If the printer capability of the selected printer is "Enabled," the system may proceed to to the next step 322 to proceed with printing. In step 322, the print application 226 may prepare the data for printing. In one example, the mobile phone printing application may use the mobile phone local communications subsystem 210 to communicate with the printer communications subsystem 212 to discover available printing options, such as page size, number of images per page, print quality, etc. These options may then be presented to the user via the mobile phone user interface 208, which also enables the user to choose desired options and settings. This function may be reduced or eliminated if the printer capability is "Limited." In one example, this function may use an existing protocol such as Bluetooth® Basic Print Service.

In a next step 324, the user may indicate that the print job should begin. In this step, the mobile phone printing application may communicate with the printer, sending the data to be printed and any specified options. In one example where the carrier has provided the mobile phone with an authorization code, the mobile phone may supply this authorization code to the printer in this step. The communication between the mobile phone and the printer may use an existing protocol, such as Bluetooth® Basic Printing Profile, or may be a specially developed protocol for this purpose.

When the print operation is complete, and assuming the print operation is successfully completed, the printer may respond to the mobile phone with a "print complete" message (step 326). This message may use an existing protocol, such as Bluetooth® Basic Printing Profile, or may use a protocol particularly developed for this purpose. In one example, in addition to standard protocol information, this message may include some or all of the following additional fields:

Integer or string: number of pages printed
Integer or string: number of ink units consumed Alternatively, if the print operation is not completed successfully, the printer may send an error message to the Mobile Phone (step 328). This error message may include details of why the print operation was not completed successfully. For example, the error message may let the mobile phone know that the printer ran out of paper or ink, or that a jam occurred. In one embodiment, the system may be configured such that this error message may also supply information used for revenue sharing. The error message may contain information similar to that contained in a "print complete" message discussed below (e.g., number of pages printed, to amount of ink used etc.). Thus, even though the print operation was not entirely completed (For example, if one page out of three was printed, but the other two were not due to lack of paper), in some circumstances, the carrier may recover revenue for the completed part of the print operation. In another example, the carrier may recover revenue simply based on the data being transmitted to the printer for printing. Many possible revenue sharing arrangements are possible between the carriers and the printer vendors and it is to be appreciated that the invention is not limited to any particular arrangement.

After receiving the job complete message from the printer, the mobile phone may, in turn, send a "print complete" message to the carrier (step 330). In one example, this message may include any or all of the following information: the printer Billing ID, the Authorization Code (if provided in step 314), the number of pages consumed, and the number of ink units consumed. In one example, the message may be sent in packet format to the Network communications subsystem 218, as discussed above. An example of such a packet may include some or all of the following fields:

Header: pre-assigned integer value indicating "Print Job Complete"
Integer or string: success or failure indication
Integer or string: authorization code
Integer or string: number of pages printed
Integer or string: number of ink units consumed In a next step 332, the network communications subsystem 218 may provide the information from the print complete message to the transaction logging database 222 for storage. This stored information may be transmitted (step 334), either immediately or in the future, to an external billing system for revenue sharing between the printer vendor and the carrier. In one example, the transmitted data may be similar to that provided in the print complete message received by the carrier.

Thus, in summary, the methods and apparatus of embodiments of the invention may allow carriers and printer vendors to share in the revenue generated when a user prints a picture directly from a mobile phone, rather than transmitting the picture as an email message. This may benefit printer vendors by the promotion of printing, which generates increased consumable sales (and hence profit), and may benefit mobile phone network operators (carriers) by providing incremental revenue opportunities from subscribers. It is to be appreciated that the method steps discussed above may be implemented on the corresponding apparatus, for example, as shown in FIG. 2, and may be provided as one or more sets of instructions encoded on computer readable media and executable on one or more computers.

Having thus described several aspects of at least one embodiment of this invention, it is to be appreciated various alterations, modifications, and improvements will readily occur to those skilled in the art. Such and other alterations, modifications, and improvements are intended to be part of this disclosure and are intended to be within the scope of the invention. Accordingly, the foregoing description and drawings are by way of example only and the scope of the invention should be determined from proper construction of the appended claims, and their equivalents.

What is claimed is:

1. A method of providing printing access to a mobile device having a local communications subsystem and a mobile network communications subsystem, the method comprising the acts of:

receiving, over a local communications subsystem of a printer, a print inquiry from the local communications subsystem of the mobile device;

providing, over the local communications subsystem of the printer, information from the printer to the local communications subsystem of the mobile device responsive to the print inquiry, the information uniquely identifying the printer;

receiving, over the local communications subsystem of the printer, a print request from the local communications subsystem of the mobile device responsive to a determination that a revenue sharing arrangement exists between the printer and a network service provider of the mobile device;

printing responsive to the print request; and sending a print complete notification to the local communications subsystem of the mobile device.

2. The method of claim 1, wherein the act of providing the information includes providing at least one of a serial number of the printer, a model name of the printer, an ink cartridge serial number, an ink cartridge model number, and a name of a vendor of the printer.

3. The method of claim 1, wherein the act of receiving the print request includes receiving data corresponding to an image to be printed.

4. The method of claim 3, further comprising an act of providing, over the mobile network communications subsystem of the mobile device, printing options information to the mobile device, the printing options information identifying whether the revenue sharing arrangement between the printer and the network service provider of the mobile device is one of enabled and limited.

5. The method of claim 4, further comprising an act of displaying, on the mobile device, a limited number of printing options in response to the revenue sharing arrangement between the printer and the network service provider of the mobile device being limited.

6. The method of claim 1, wherein the act of sending the print complete notification includes sending information including at least one of a printer billing identification code, a number of pages printed, and a number of ink units consumed during the act of printing.

7. The method of claim 6, wherein the print complete notification is a first print complete notification, the method further comprising an act of sending, over the mobile network communications subsystem of the mobile device, a second print complete notification from the mobile device to the network service provider, the second print complete notification includes at least one of the printer billing identification code, the number of pages printed, and the number of ink units consumed during the act of printing.

8. A computer-readable medium having non-transient computer-readable signals stored thereon that define instructions that, as a result of being executed by a computer, instruct the computer to perform the method of claim 1.

* * * * *

UNITED STATES PATENT AND TRADEMARK OFFICE
CERTIFICATE OF CORRECTION

PATENT NO.         : 8,547,583 B2                                        Page 1 of 1
APPLICATION NO.    : 13/564011
DATED              : October 1, 2013
INVENTOR(S)        : Dolan et al.

It is certified that error appears in the above-identified patent and that said Letters Patent is hereby corrected as shown below:

In the Specification:

Column 1, Line 56, delete "in to accordance" and insert -- in accordance --, therefor.

Column 3, Line 65, delete "wireless to" and insert -- wireless --, therefor.

Column 4, Line 48, delete "or to" and insert -- or --, therefor.

Column 5, Line 29, delete "network 200 to" and insert -- network 200 --, therefor.

Column 6, Line 9, delete "or to" and insert -- or --, therefor.

Column 7, Lines 32-33, delete "for to" and insert -- for --, therefor.

Column 8, Line 15, delete "to to the" and insert -- to the --, therefor.

Column 8, Line 59, delete "printed, to" and insert -- printed, --, therefor.

Signed and Sealed this
Fourth Day of March, 2014

Michelle K. Lee
*Deputy Director of the United States Patent and Trademark Office*